Nov. 3, 1964  K. EICHHOLTZ  3,154,916
PROPULSIVE AND LIFTING CONVERTIBLE JET ENGINE UNIT
Filed July 26, 1962  4 Sheets-Sheet 1

Fig.:1

INVENTOR
Konrad Eichholtz
By Watson, Cole, Grindle & Watson
ATTORNEYS

Nov. 3, 1964   K. EICHHOLTZ   3,154,916
PROPULSIVE AND LIFTING CONVERTIBLE JET ENGINE UNIT
Filed July 26, 1962   4 Sheets-Sheet 4
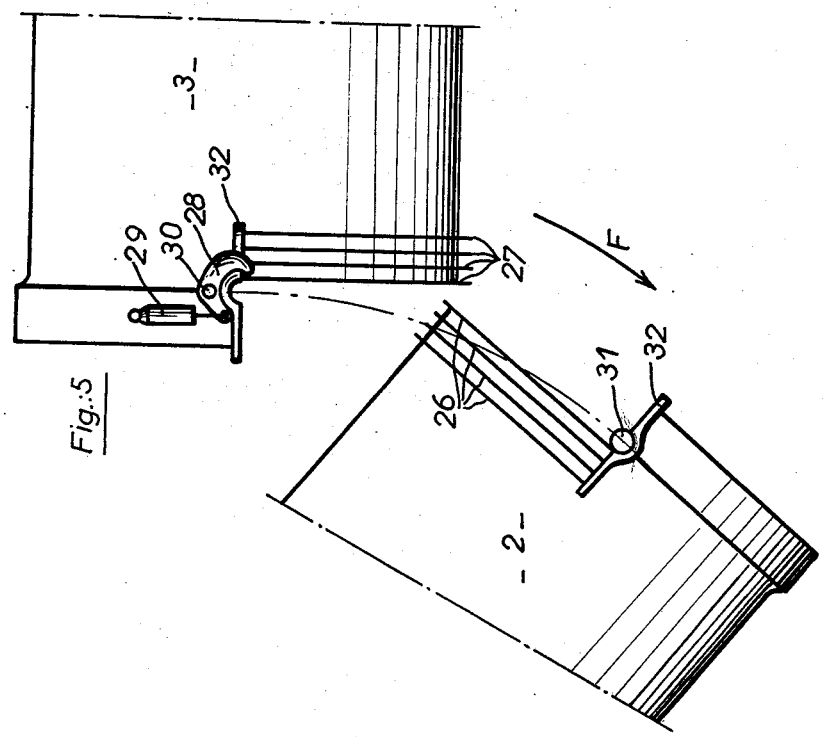
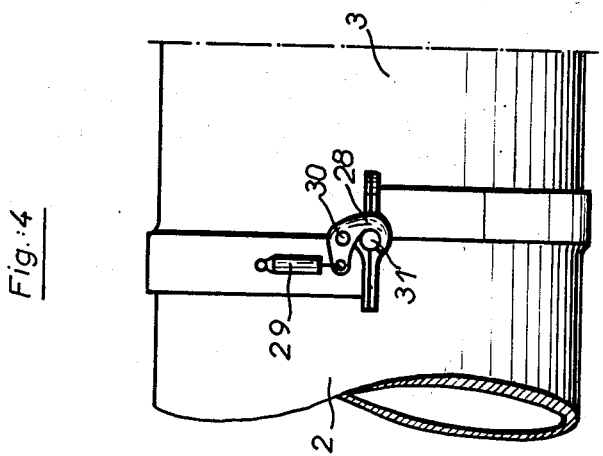
INVENTOR
Konrad Eichholtz
By Watson, Cole, Grindle & Watson
ATTORNEYS

United States Patent Office 3,154,916
Patented Nov. 3, 1964

3,154,916
PROPULSIVE AND LIFTING CONVERTIBLE
JET ENGINE UNIT
Konrad Eichholtz, Dammarie-les-Lys, Seine et Marne,
France, assignor to Societe Nationale d'Etude et de
Construction de Moteurs d'Aviation, Paris, France, a
company of France
Filed July 26, 1962, Ser. No. 212,592
Claims priority, application France, Aug. 4, 1961, 870,098
8 Claims. (Cl. 60—35.54)

The present invention relates to an aircraft engine unit designed to produce a propulsive thrust during normal flight, more particularly at high speeds, and a lifting thrust when flying at low speeds or at zero speed, for example during short-run or vertical take-off and landing.

This engine unit is constituted by a thermodynamic duct extending longitudinally of the aircraft and having three successive parts: An upstream part having an air inlet, an intermediate part containing a turbine engine, and a downstream part terminating in a propulsion discharge nozzle. The essential feature of the invention resides in the fact that if the upstream and downstream parts of the duct are fixed, the intermediate part is mounted to be pivotable about an axis directed transversely of the aircraft and situated at the lower portion of its junction with the upstream part, so that this intermediate part which contains the turbine engine can pivot downwardly in order to produce a lifting thrust.

In addition to the turbine engine, the pivotable intermediate part advantageously comprises a device for heating and/or re-heating the flow which passes through it, in order to produce an increased thrust. It may also be provided with a device for regulating its outlet cross-section, this device preferably acting by pneumatic constriction.

According to a preferred form of embodiment of the present invention, the turbine engine mounted in the intermediate part comprises a fan or low-pressure compressor driven wholly or partly by the useful power emanating from a gas generator situated in a second duct separate from the first duct, which useful power can be supplied in the form of compressed air into the combustion chamber of a small turbine coupled to the low-pressure compressor. The two ducts thus form a composite jet engine unit of the kind described in my patent application Ser. No. 152,897 filed on Nov. 16, 1961.

As is stated in that document, the low-pressure compressor is advantageously provided with a device whereby the delivery and the ratio of pressures can be varied continuously under all conditions of flight, taking into account the permissible axial Mach number at the inlet of the compressor.

The supply of compressed air to the combustion chamber of the turbine engine, and if appropriate for the pneumatic constriction device, can be effected according to the present invention through the agency of the pivoting shaft of the intermediate part, the said shaft being hollow and connected to a compressed air feed duct.

The following description with reference to the accompanying drawings, given by way of non-limitative example, will make it easy to understand how the invention can be carried into effect.

FIGURES 4 and 5 are partial external views showing a constructional detail.

Figure 1:
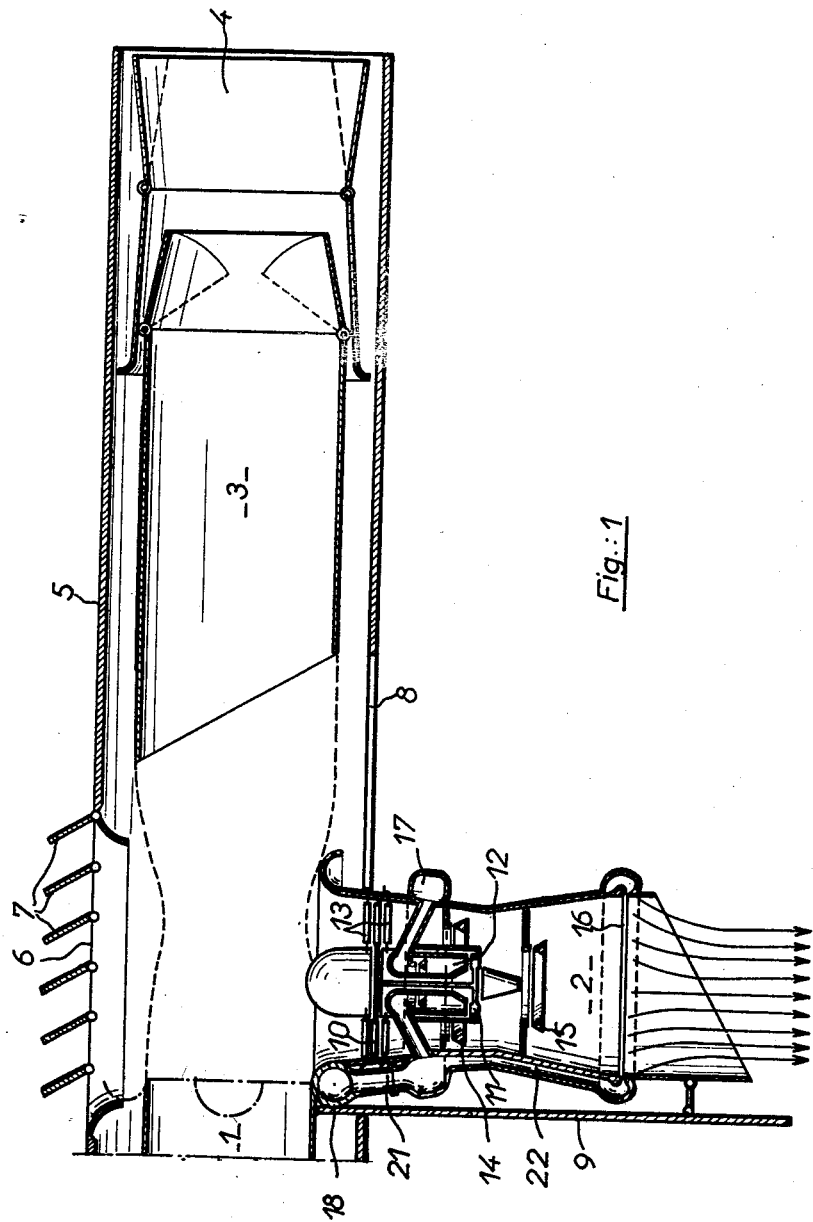
FIGURE 1 is a longitudinal sectional view of one form of embodiment of the invention, the engine unit being in the lifting position.

In the form of embodiment illustrated in the drawings, the jet engine unit is constituted by a thermodynamic duct extending in the longitudinal direction of the aircraft and consisting of three parts: An upstream fixed part 1 debouching forwardly in an air inlet (not shown) which may be of convergent-divergent form and can be regulatable, a pivotable intermediate part 2, and a fixed downstream part 3 terminating in a propulsion discharge nozzle 4 which is also convergent-divergent in form and is regulatable. This duct is mounted in a streamlined easing 5 having, level with the pivotable part 2, an upper aperture 6 which can be closed by a series of shutters 7, and at the lower portion an aperture 8 which is closed by a trap door 9.

The pivotable part 2 contains a turbine engine composed of a low-pressure compressor 10 driven by a turbine 11 of which 12 is the combustion chamber, this low-pressure compressor being equipped with a device for the desired orientation of its guiding blades 13 which makes it possible to vary continuously the delivery and the ratio of pressures of the compressor. A device 14 for heating the flow of air delivered by this compressor, and a re-heating or post-combustion device 15 for the mixture of this air and the exhaust gases from the turbine 11, are arranged in this pivotable part 2. The terminal section of the latter is adjustable in cross-section owing to a pneumatic constriction device 16 using a cold or hot auxiliary jet.

The pivotable part 2 pivots about a hollow shaft 18 extending transversely of the aircraft and pivoting in bearings 19—19; this shaft, situated at the lower portion of the junction of the pivoting part 2 with the fixed upstream part 1 is connected to a compressed air feed pipe 20. Proceeding from the hollow shaft 18 is a pipe 21 feeding a collector 17 communicating with the combustion chamber 12. The pipe 22 for branching off compressed air for the pneumatic constriction device 16 can be connected either to the said collector 17 in the case of constriction by cold air as represented in the drawings, or to the chamber of the turbine 11 or to a special chamber in the case of constriction by hot gases (not shown).

The pipe 20 is fed with compressed air coming from a second duct (not shown) which contains a gas generator. Thus, the low-pressure compressor 10 is driven wholly or partly by the useful power emanating from this second duct in the form of compressed air supplied to the combustion chamber 12 by means of the collector 17.

The pivotable part 2 with its turbine engines 10-11 and its associated means, can therefore pivot in its entirety about the hollow shaft 18 from the position shown in broken lines in FIGURE 1 in which the said part is inserted between the fixed parts 1 and 3 to provide a continuous thermodynamic duct line, and a position shown in full lines in which the axis of the part 2 can form a right angle with the axis of the parts 1 and 3. Of course, the pivotable part 2 could take up any intermediate position.

Figure 2:
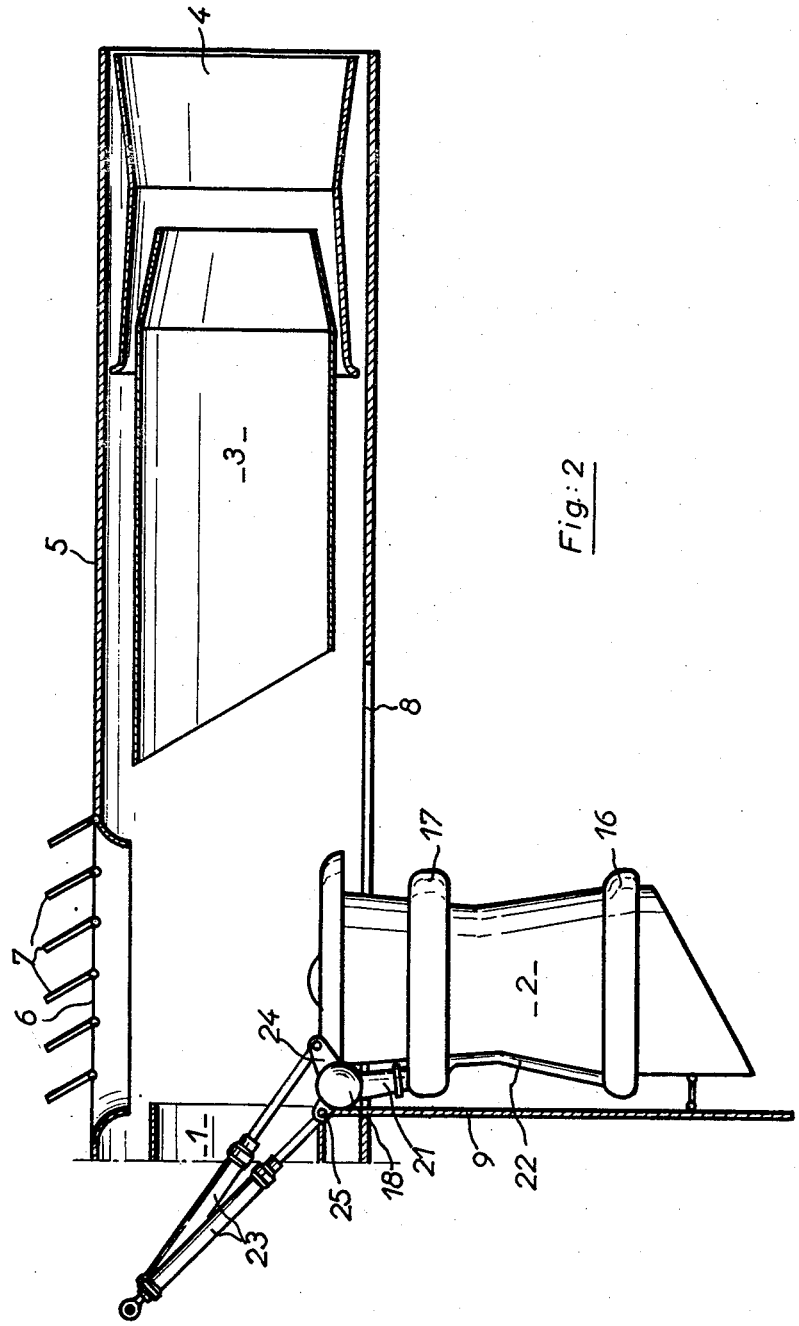
FIGURES 2 and 3 are side elevation and front views showing diagrammatically a mechanism for controlling pivoting.
Figure 3:
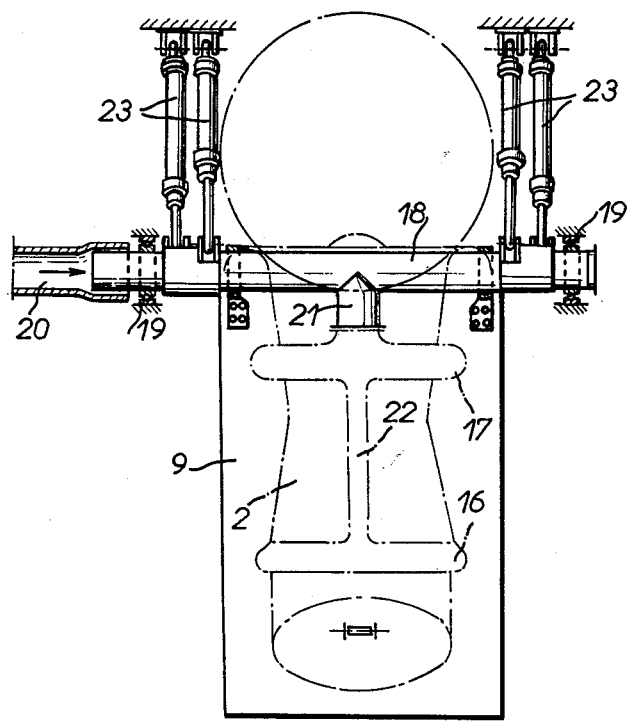

The control of the pivoting movement may be effected by any suitable means, and by way of example FIGURES 2 and 3 show a set of jacks 23 pivotably connected to cranks 24, 25 fast with the hollow shaft 18.

The engine unit which has just been described operates in the following manner:

For normal flight at high speeds, the intermediate part 2 is in prolongation of the upstream and downstream parts 1 and 3, that is to say in the position shown in FIGURE 4 and also in broken lines in FIGURE 1. Thus the continuity of the thermodynamic duct is established, and the engine unit operates in the manner described in the patent application mentioned hereinbefore.

For jet-lift flight at low speeds or at zero speed, the intermediate part 2 is pivoted about its hollow shaft 18 in the direction indicated by the arrow F (FIGURE 5); the trap door 9 forming part of the easing 5 of course follows the angular displacement of the part 2. The shutters 7 are then opened, thus unmasking the aperture 6 at the upper portion of this easing. This facilitates the intake of atmospheric air by the low-pressure compressor 10, the entry of air being also promoted by the action of the open shutters 7 which act as deflectors.

FIGURES 4 and 5 show, in the case of a junction between the two parts 2 and 3 along two half cross-sections offset relatively to one another, how the sealing, fixing and centering elements can be arranged.

For the upper semi-circular junction, sealing elements or laminae 26 of semi-circular form also, are mounted externally on the upper half-edge of the part 2 and form, in the closed position, a labyrinth seal with the inner wall of the upper half-edge of the part 3, which can be provided with similar sealing elements or laminae which engage in the intervals between the first. For the lower semi-circular junction, sealing-tightness is ensured in a similar manner by laminae 27 of the part 3.

For the junction at the two plane surfaces situated diametrally opposite, due to the offsetting of the two aforesaid half cross-sections, a sealing element 32 can be provided at each junction plane.

At each side, a hook 28 actuated by a jack 29 pivots about a pin 30 on the downstream part 3 and surrounds a stud 31 fast with the pivotable part 2, coupling the two parts together. Thus, sealing-tightness is obtained over all the junction surfaces.

In order to make it possible to compensate for variations in the length of the intermediate part 2 due to temperature, the downstream part 3 is provided with a suspension permitting longitudinal movement.

What is claimed is:

1. A jet propulsion engine of the kind having in cooperative combination an air-intake casing, a rotary air-driving machine and a gas-expansion nozzle, said engine comprising a stationary front duct portion which includes said air-intake casing, a stationary rear duct portion which includes said gas-expansion nozzle, a pivotable central duct portion which includes said rotary machine and which is coextensive in normal configuration with said stationary duct portions and intermediate the same, said central duct portion being pivotally linked to said stationary front duct portion about a transverse axis through the lower part of the connecting section of said front and central duct portions, and non-pivotable means external to said pivotable duct portion for supplying driving power to said rotary machine therein.

2. Engine as claimed in claim 1, wherein the rotary air-driving machine comprises a turbine-driven fan discharging air through the central duct portion, and the external non-pivotable means comprises a source of compressed air connected to the inlet of the turbine driving said fan.

3. Engine as claimed in claim 2, wherein the pivotal link between the stationary front portion and the pivotable central portion comprises a hollow hinge along the transverse axis through the lower part of the connecting section of said portions, the interior of said hollow hinge being connected on the one hand with the source of compressed air and on the other hand with the inlet of the turbine.

4. Engine as claimed in claim 3, comprising burner means in the compressed-air flow between the hollow hinge and the inlet of the turbine.

5. Engine as claimed in claim 2, comprising burner means in the pivotable central duct portion within the air flow discharged by the fan and at a distance upstream of the end of said pivotable duct portion remote from the stationary front duct portion.

6. Engine as claimed in claim 5, comprising pneumatically-acting area control means at said end of the pivotable duct portion, connected with the external source of compressed air to be fed thereby.

7. Engine as claimed in claim 1, comprising a servo-motor for controlling the angular position of the pivotable central duct portion, and means distinct from said servo-motor for locking said central portion in coextensive position with respect to the two other portions.

8. Engine as claimed in claim 1, comprising peripheral fin-like projections adjacent the connecting section of the central and rear duct portions in normal configuration and adapted to improve gas-tightness at said section.

References Cited in the file of this patent

UNITED STATES PATENTS

| 3,053,477 | Reiniger | Sept. 11, 1962 |
| 3,056,565 | Griffith | Oct. 2, 1962 |

FOREIGN PATENTS

| 1,086,560 | Germany | Aug. 4, 1960 |
| 820,427 | Great Britain | Sept. 23, 1959 |